Aug. 28, 1928.

C. OFFENHAUSER 1,682,535

SEPARATOR

Filed Dec. 8, 1926 — 2 Sheets-Sheet 1

INVENTOR
Christopher Offenhauser
by
Herbert S. Fairbanks
ATTORNEY

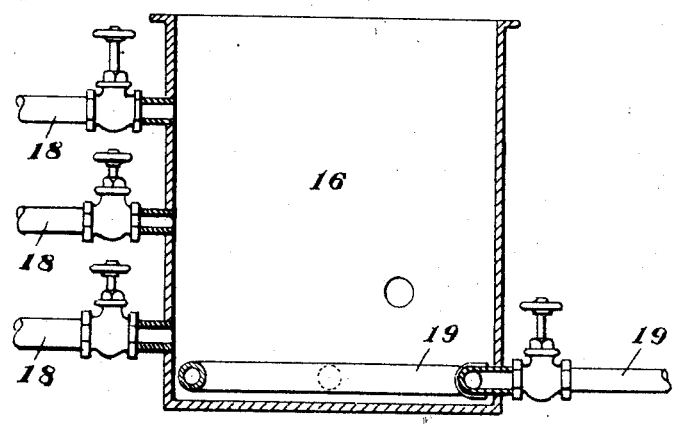
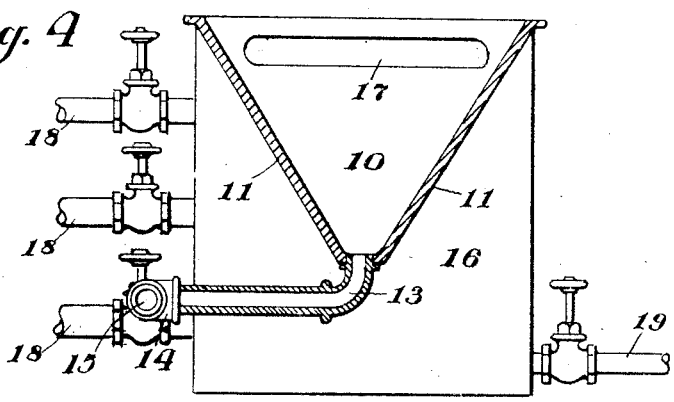
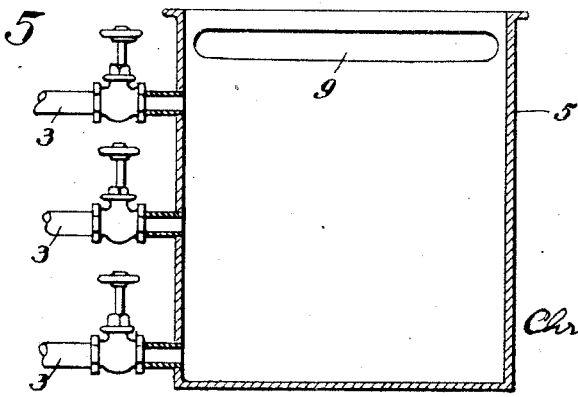

Patented Aug. 28, 1928.

1,682,535

UNITED STATES PATENT OFFICE.

CHRISTOPHER OFFENHAUSER, OF PHILADELPHIA, PENNSYLVANIA.

SEPARATOR.

Application filed December 8, 1926. Serial No. 153,297.

The object of this invention is to devise a novel construction and arrangement of a separator wherein the parts which are heavier than water can be separated and removed and wherein the parts are lighter than water can also be separated and removed.

One use of my invention is in the seperation of particles heavier than water from an oil solution and also the recovery of the fats and oils contained in the solution.

With the above and other objects in view as will hereinafter more clearly appear, my invention comprehends a novel construction and arrangement of a separator.

It further comprehends a novel separator comprising a plurality of intercommunicating receptacles, in one of which the particles heavier than water are adapted to be removed and in another of which the particles lighter than water are adapted to be removed.

It further comprehends a novel separator having a plurality of intercommunicating receptacles provided with means for varying the level of the liquid therein and also with means for effecting the recovery of the parts separated.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities as herein set forth.

Figure 3 is a section on line 3—3 of Figure 1.

Figure 4 is a section on line 4—4 of Figure 1.

Figure 5 is a section on line 5—5 of Figure 1.

Similar numerals of reference indicate corresponding parts.

Referring to the drawings:—

Figure 1:
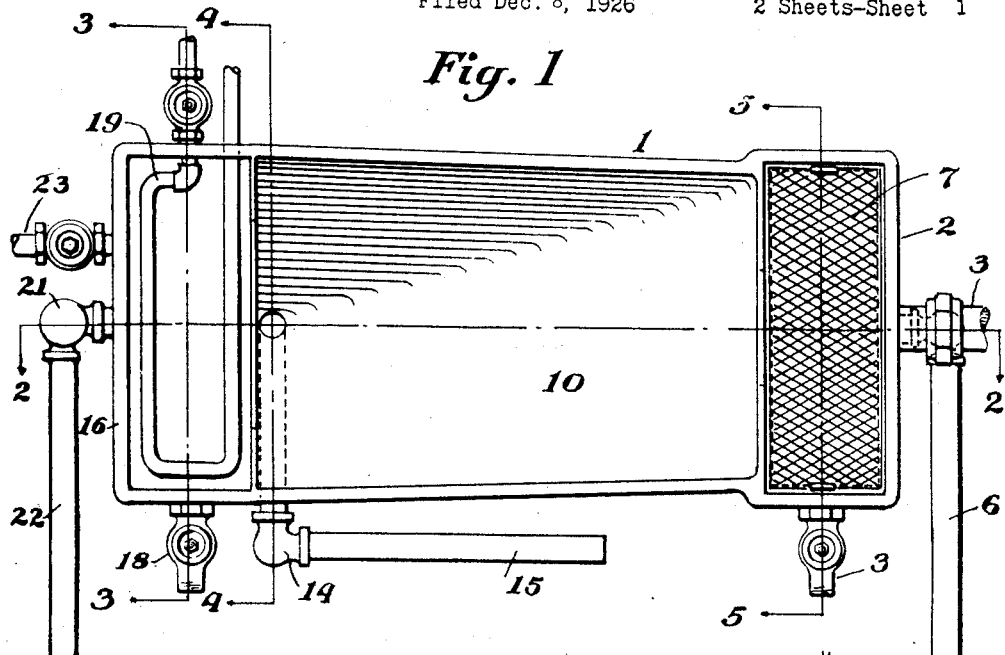
Figure 1 is a top plan view of a separator embodying my invention.

1 designates a separator embodying my invention. The separator consists of a receiving tank 2 into which the solution or liquid to be treated is fed by means of a pipe 3 which discharges into said tank near its upper end. The tank 2 is provided with a desired number of valve controlled outlets 3, see more particularly Figure 5, from which it will be seen that these outlets are positioned at different heights.

The tank 2 has communicating with it, near its lower end, a conduit 4 which is connected by means of a coupling 5 with a pipe 6 by means of which the liquid in the tank 2 can be withdrawn from the bottom of the tank.

This tank 2 is adapted to receive a perforated basket 7, which can be removed when desired by means of a chain 8, which is connected to any desired type of hoisting mechanism, (not shown).

Figure 2:
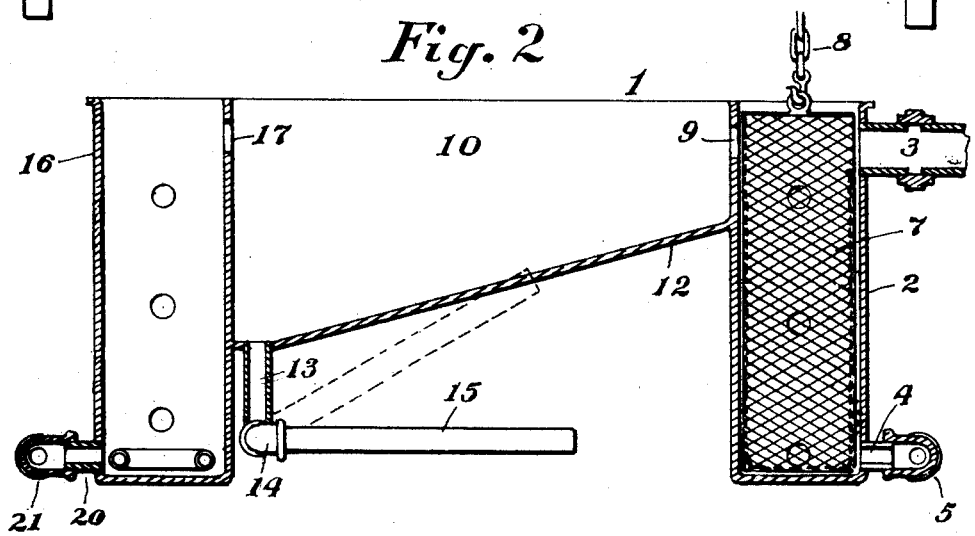
Figure 2 is a section on line 2—2 of Figure 1.

The tank 2 is provided with an elongated discharge port 9, see more particularly Figures 2 and 5 and this discharge port passes liquid to a container 10, the side walls of which preferably converge as shown at 11 in Figure 4, and the bottom wall inclines downwardly, as at 12, as indicated in Figure 2.

This bottom 12 at its lower end is provided with a discharge conduit 15 which is connected by means of a rotatable fitting 14 with a conduit 15 which can be used as a level controller to withdraw the liquid, or a desired portion of it, from the container 10.

The container 10 has its lower end wall formed by a wall of a tank 16, and this tank communicates by means of an elongated port 17 with the containers 10. The tank 16 is provided with a desired number of valve controlled discharge conduits 18 positioned at different heights above the bottom of the tank 16.

The valve controlled steam conduit 19 is disposed in the bottom of the tank 16 so that the liquid contained therein can be suitably heated as desired.

Near the bottom of the tank 16, I provide a discharge outlet 20 which is connected by means of a rotatable fitting 21 with a conduit 22 so that such conduit 22 can be raised and lowered to withdraw liquid from the tank 16.

In order to raise the level in the tank 16, I provide a valve controlled conduit 23 which communicates with the tank 16 near its bottom.

The operation of my separator will now be readily apparent to those skilled in this art and is as follows:—

Assuming that it is to be employed for separating oil and broken bones from a solution containing such material, the solution flows through the conduit 3 into the perforated basket 7 in the tank 2 so that the particles of the bone or other foreign material contained in the fluid will be retained in the basket 7.

The water and oil flow through the discharge port 9 into the container 10 and the flow in this container 10 is preferably slow so that the oil will have a chance to rise to the surface and float on the top of the water so that such oil will pass through the port 17 into the tank 16 which serves as an oil receiver.

The oil in the tank 16 can be withdrawn by opening one of the valve controlled conduits 18 and the level of the oil in this tank 16 can be varied by either introducing water through the valve controlled conduit 23 to raise the level of the oil so that it will flow through a desired valve controlled conduit 18, or the free end of the conduit 22 may be lowered so as to withdraw the water from the tank 16 and lower the level of the oil so that it can be removed through a desired valve controlled conduit 18.

The level of the oil in the container 10 can also be varied by raising or lowering the free end of the conduit 15. It will be understood that when the conduit 15 is raised to the height of the top of the discharge port 17 then no water will be withdrawn through the conduit 15.

The water or other liquid in the tank 2 can also be withdrawn through the conduit 6, it being seen that when this conduit 6 is turned to bring its free end above the discharge port 9, the liquid will not flow through the discharge port 9.

At any time desired, the liquid can be withdrawn through the conduit 6. The conduit 6 is also designed to be employed to lower the level so that the oil or other material floating on the surface of the water can be withdrawn by one of the valve controlled conduits 3.

In accordance with my present invention a large quantity of liquid can be handled in a minimum of time and the different materials carried by the liquid can be recovered in accordance with their varying specific gravities. The perforated basket 7 can be withdrawn and emptied whenever it becomes filled.

Having thus described my invention what I claim as new and desire to secure by Letters Patent, is:—

1. In a separator, a receiving tank, a discharge tank, an intermediate tank connecting said tanks and of greater length than width and having its sides converging downwardly and its bottom inclining downwardly in the direction of flow, said receiving tank having its upper end discharging into said intermediate tank, said intermediate tank having its upper portion discharging into said discharge tank, and means to withdraw liquid at different levels from said discharge tank.

2. In a separator, a receiving tank, a discharge tank, an intermediate tank connecting said tanks and of greater length than width and having its sides converging downwardly and its bottom inclining downwardly in the direction of flow, said receiving tank having its upper end discharging into said intermediate tank, said intermediate tank having its upper portion discharging into said discharge tank, means to withdraw liquid at different levels from said discharge tank, and liquid heating means in said discharge tank.

3. In a separator, a receiving tank, a discharge tank, an intermediate tank connecting said tanks and of greater length than width and having its sides converging downwardly and its bottom inclining downwardly in the direction of flow, said receiving tank having its upper end discharging into said intermediate tank, said intermediate tank having its upper portion discharging into said discharge tank, means to withdraw liquid at different levels from said receiving and discharge tanks, and means to withdraw liquid from the lower end of said intermediate tank.

CHRISTOPHER OFFENHAUSER.